(12) United States Patent
Hikmet et al.

(10) Patent No.: US 12,410,892 B2
(45) Date of Patent: Sep. 9, 2025

(54) EYE SAFE LASER LIGHTING SYSTEM USING BUILT IN SAFETY

(71) Applicant: SIGNIFY HOLDING B.V., Eindhoven (NL)

(72) Inventors: Rifat Ata Mustafa Hikmet, Eindhoven (NL); Dominique Maria Bruls, Heeze (NL); Robert Van Asselt, Valkenswaard (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/425,081

(22) Filed: Jan. 29, 2024

(65) Prior Publication Data

US 2024/0167642 A1 May 23, 2024

Related U.S. Application Data

(62) Division of application No. 18/019,735, filed as application No. PCT/EP2021/072120 on Aug. 9, 2021.

(30) Foreign Application Priority Data

Aug. 13, 2020 (EP) ..................................... 20190802

(51) Int. Cl.
*F21K 9/64* (2016.01)
*F21V 7/00* (2006.01)
(Continued)

(52) U.S. Cl.
CPC .............. *F21K 9/64* (2016.08); *F21V 7/0025* (2013.01); *F21V 7/22* (2013.01); *F21V 9/14* (2013.01);
(Continued)

(58) Field of Classification Search
CPC . F21K 9/64; F21V 9/32; F21V 7/0025; F21V 7/22; F21V 9/14
See application file for complete search history.

(56) References Cited

U.S. PATENT DOCUMENTS

2015/0204514 A1  7/2015  Cao et al.
2017/0269279 A1* 9/2017  Wyatt ..................... H01L 33/46
(Continued)

FOREIGN PATENT DOCUMENTS

WO  2016193230 A1  12/2016

*Primary Examiner* — Christopher E Dunay

(57) ABSTRACT

The invention provides a light generating system (1000) comprising a light generating device (100), a luminescent material layer (200), and optics (400), wherein: (I) the light generating device (100) is configured to generate polarized laser radiation (101); (II) the luminescent material layer (200) comprises a luminescent material (210) configured in a light-receiving relationship with the light generating device (100) and configured to convert at least part of the polarized laser radiation (101) into luminescent material radiation (211); (III) the light generating system (1000) is configured to generate in an operational mode system light (1001) at least comprising the luminescent material radiation (211); (IV) the optics (400) comprise first optics (410) and second optics (420); wherein the first optics (410) are configured to change the polarization of the polarized laser radiation (101), and wherein the second optics (420) have one or more of (i) a polarization dependent transmission and (ii) a polarization dependent reflection for the polarized laser radiation (101); and (V) the light generating device (100) and the optics (200) are configured such that, relative to an optical path of the luminescent material radiation (211) emanating from the luminescent material (210), the second optics (420) are configured downstream from the first optics (410) and the luminescent material (210).

12 Claims, 5 Drawing Sheets

(51) Int. Cl.
  *F21V 7/22*    (2018.01)
  *F21V 9/14*    (2006.01)
  *F21V 9/32*    (2018.01)
  F21V 25/02   (2006.01)
  F21Y 115/30  (2016.01)

(52) U.S. Cl.
  CPC ............... *F21V 9/32* (2018.02); *F21V 25/02* (2013.01); *F21Y 2115/30* (2016.08)

(56) References Cited

U.S. PATENT DOCUMENTS

2017/0284609 A1* 10/2017 Hirasawa ................ H01L 33/54
2017/0350563 A1* 12/2017 Lunz ......................... F21K 9/64
2018/0320851 A1   11/2018 Zozgornik
2020/0056751 A1    2/2020 Sugiyama et al.
2022/0341550 A1* 10/2022 Hikmet ................. H01S 5/0087
2023/0064361 A1*  3/2023 Cornelissen ............ F21V 29/50
2023/0235873 A1*  7/2023 Hikmet .................... F21V 9/30
                                                               362/84

* cited by examiner

EYE SAFE LASER LIGHTING SYSTEM USING BUILT IN SAFETY

CROSS REFERENCE TO RELATED CASES

This application is a Divisional application of pending U.S. Ser. No. 18/019,735, filed Feb. 3, 2023, which is the U.S. National Phase Application of International Application PCT/EP2021/072120, filed Aug. 9, 2021, and claims the benefit of European Patent Application No. 20190802.7, filed Aug. 13, 2020. These application are hereby incorporate by reference.

FIELD OF THE INVENTION

The invention relates to a light generating system as well as to a light generating device comprising such light generating system.

BACKGROUND OF THE INVENTION

Laser systems with protection devices are known in the art. US2019323803, for instance, describes a laser system comprising: an active laser with at least one beam guide and an effective range about an object/target when the active laser is in use; a protection device with at least one additional laser that operates in a visible spectral range, wherein the at least one additional laser is switched on if at least one person has been detected in the effective range of the active laser before the active laser is used.

SUMMARY OF THE INVENTION

High brightness light sources can be used in applications such as projection, stage-lighting, spot-lighting and automotive lighting. For this purpose, laser-phosphor technology can be used wherein a laser provides laser light and a remote phosphor converts laser light into converted light.

The easiest way to produce white light using lasers is to use pump light in combination with converted light to produce white light. When the phosphor gets damaged an unsafe situation can occur where direct laser light comes out of the light source.

Hence, it is an aspect of the invention to provide an alternative (laser-based) light generating system, which preferably further at least partly obviates one or more of above-described drawbacks. The present invention may have as object to overcome or ameliorate at least one of the disadvantages of the prior art, or to provide a useful alternative.

Amongst others, in embodiments herein a built in safety mechanism is proposed which may block the laser light leaving the light source without the need for an electrical detection circuit. For this purpose, amongst others in embodiments using the polarization sensitive components together with a ½ or ¼ wave plate is suggested, which may be destroyed when phosphor is damaged, or which is removed when the phosphor is removed.

For example, in embodiments in a transmissive mode phosphor may be placed on a dichroic mirror which reflects phosphor emission. On top of the phosphor a half wave plate may be placed followed by a polarizing dichroic filter which reflects p-polarized blue light. When e.g. p-polarized blue light used to excite the phosphor blue light which is not absorbed by the phosphor gets transmitted through the phosphor and rotated by the wave plate to become s polarized. In the s-polarization state it is also transmitted by the dichroic filter which reflects only p-polarized blue light. During the operation when the phosphor would be destroyed, the wave plate on top of it may also become destroyed. This may imply that the p-polarized blue light keeps its p-polarization and gets reflected by the dichroic reflector which reflects p-polarization. In this way blue light escaping the device upon phosphor destruction may be avoided in a simple way, without the necessity of additional electronics.

Hence, in an aspect the invention provides a light generating system comprising a light generating device (or "radiation generating device"), a luminescent material layer, and optics. Especially, the light generating device may be configured to generate polarized laser radiation. Further, the luminescent material layer comprises a luminescent material, especially configured in a light-receiving relationship with the light generating device. In embodiments, the luminescent material layer is configured to convert at least part of the polarized laser radiation into luminescent material radiation. Especially, the light generating system is configured to generate in an operational mode system light at least comprising the luminescent material radiation. Yet further, in embodiments the optics may comprise first optics and second optics. In embodiments, the first optics and second optics have one or more of (i) a polarization dependent transmission, (ii) a polarization dependent reflection for the polarized laser radiation, and (iii) a polarization change effect. Especially, in embodiments the first optics are configured to change the polarization of the polarized laser radiation. Alternatively or additionally, in embodiments the second optics have one or more of (i) a polarization dependent transmission and (ii) a polarization dependent reflection for the polarized laser radiation. In specific embodiments, the first optics are configured to change the polarization of the polarized laser radiation, and the second optics have one or more of (i) a polarization dependent transmission and (ii) a polarization dependent reflection for the polarized laser radiation. Further, especially the light generating device and the optics are configured such that at least part of polarized laser radiation (if any) not absorbed by the luminescent material may pass the first optics and the second optics. Further, in embodiments, relative to the luminescent material, the second optics are configured downstream from the first optics and (from) the luminescent material. Yet, in embodiments the light generating device and the optics are configured such that, relative to an optical path of the luminescent material radiation emanating from the luminescent material, the second optics are configured downstream from the first optics and the luminescent material.

Hence, especially the invention provides in embodiments a light generating system comprising a light generating device, a luminescent material layer, and optics, wherein: (a) the light generating device is configured to generate polarized laser radiation; (b) the luminescent material layer comprises a luminescent material configured in a light-receiving relationship with the light generating device and configured to convert at least part of the polarized laser radiation into luminescent material radiation; (c) the light generating system is configured to generate in an operational mode system light at least comprising the luminescent material radiation; (d) the optics comprise first optics and second optics, wherein the first optics and second optics have one or more of (i) a polarization dependent transmission and (ii) a polarization dependent reflection for the polarized laser radiation; wherein the first optics are configured to change the polarization of the polarized laser radiation; and (e) the light generating device and the optics are configured such that at least part of polarized laser radiation not absorbed by the luminescent material passes the first optics and the second optics, wherein relative to the luminescent material the second optics are configured downstream from the first optics and the luminescent material. Further, especially the invention provides in embodiments a light generating system comprising a light generating device, a luminescent material layer, and optics, wherein: (I) the light generating device is configured to generate polarized laser radiation; (II) the luminescent material layer comprises a luminescent material configured in a light-receiving relationship with the light generating device and configured to convert at least part of the polarized laser radiation into luminescent material radiation; (III) the light generating system is configured to generate in an operational mode system light at least comprising the luminescent material radiation; (IV) the optics comprise first optics and second optics; wherein the first optics are configured to change the polarization of the polarized laser radiation, and wherein the second optics have one or more of (i) a polarization dependent transmission and (ii) a polarization dependent reflection for the polarized laser radiation; and (V) the light generating device and the optics are configured such that, relative to an optical path of the luminescent material radiation emanating from the luminescent material, the second optics are configured downstream from the first optics and the luminescent material. Especially, in embodiments the luminescent material layer may especially be coupled to the first optics. In embodiments, the luminescent material and the first optics may be configured in a layer stack.

Such light generating system may have an inherent safety (valve). Would e.g. the luminescent material show cracks, break, or even be blast away, then the first optics may also crack or break or be removed. In this way, the polarized laser light that is not absorbed by the luminescent material is filtered by the second optics and will not propagate out of the system, or will otherwise not escape from the light generating system. Hence, a relatively simple and reliable safety system for a laser light source may be provided.

As indicated above, the light generating system comprises a light generating device, a luminescent material layer, and optics. These elements will be further elucidated below.

The light generating device is configured to generate polarized laser radiation (which may also be indicated as e.g. "device radiation" or "laser radiation" or "laser device radiation"). To this end, the light generation device comprises a light source, especially a laser light source, and optionally also optics for polarizing the light source light, or altering the polarization of the light source light. Especially, the light generating device may comprise a laser, and optionally optics for collimation. Further, the light generating device may comprise a polarization element for imposition a specific polarization to the light that escapes from the light generating device. Especially, the polarized laser radiation has essentially s-polarization or p-polarization. Further embodiments of the light source are described below.

In embodiments, radiation at a specific wavelength may be s-polarized when at that wavelength 90% of the radiation has s-polarization, like at least 95%, such as essentially 100%. Likewise, in embodiments, radiation at a specific wavelength may be p-polarized when at that wavelength 90% of the radiation has p-polarization, like at least 95%, such as essentially 100%. Hence, s-polarized radiation may in embodiments essentially have 100% s polarization and p-polarized radiation may in embodiments essentially have 100% p polarization.

The luminescent material layer comprises a luminescent material. The luminescent material is especially configured in a light-receiving relationship with the light generating device.

Further, the luminescent material is especially configured to convert at least part of the polarized laser radiation into luminescent material radiation. In specific embodiments, the luminescent material is especially configured to convert all the polarized laser radiation into luminescent material radiation. In the former embodiments, the system light may in embodiments comprise unabsorbed (polarized) laser radiation. In the latter embodiment, the system light may in embodiments essentially not comprise unabsorbed (polarized) laser radiation as all radiation has been absorbed. Here, the term "(polarized) laser radiation" is used as it is not excluded that downstream of the herein described optics but (just) upstream of e.g. a radiation exit window of the system, a depolarizer may be applied. However, this is not necessarily the case.

The terms "radiationally coupled" or "optically coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material.

When elements are in optical contact or optically coupled, they may in embodiments be in physical contact with each other or may in other embodiments be separated from each other with e.g. a (thin) layer of optical material, such as an optical glue, or other optically transparent interface material, e.g. having a thickness of less than about 1 mm, preferably less than 100 µm. When no optically transparent interface material is applied, the (average) distance between two elements being in optical contact may especially be about at maximum the wavelength of relevance, such as the wavelength of an emission maximum. For visible wavelengths, this may be less than 1 µm, such as less than 0.7 µm, and for blue even smaller. Hence, when optical coupling is desired, an optically transparent interface material may be applied. In yet other embodiments, when no optically transparent interface material is applied, the average distance between two elements being in optical contact may especially be about at maximum the wavelength of relevance, such as the wavelength of an emission maximum. Hence, when optical contact is desired, there may be physical contact. However, even in such embodiments there may be a non-zero average distance, but then equal to or lower than the wavelength of interest, such as a centroid wavelength of the laser radiation.

The term "centroid wavelength", also indicated as $\lambda_c$, is known in the art, and refers to the wavelength value where half of the light energy is at shorter and half the energy is at longer wavelengths; the value is stated in nanometers (nm). It is the wavelength that divides the integral of a spectral power distribution into two equal parts as expressed by the formula $\lambda_c=\Sigma\lambda*I(\lambda)/(\Sigma I(\lambda))$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to visible light.

The term UV radiation may in specific embodiments refer to near UV radiation (NUV). Therefore, herein also the term "(N)UV" is applied, to refer to in general UV, and in specific embodiments to NUV. The term IR radiation may in specific embodiments refer to near IR radiation (NIR). Therefore, herein also the term "(N)IR" is applied, to refer to in general IR, and in specific embodiments to NIR.

The luminescent material layer may also comprise a plurality of different luminescent materials. The term "layer" may also refer to multi-layer. Especially, the luminescent material layer comprises a ceramic body. The term "ceramic body" may in specific embodiments also refer to a plurality of ceramic bodies. Hence, in embodiments the luminescent material layer may comprise a ceramic body comprising the luminescent material. Yet further, in specific embodiments the luminescent material comprises a luminescent material of the type $A_3B_5O_{12}$:Ce, wherein A comprises one or more of Y, La, Gd, Tb and Lu, and wherein B comprises one or more of Al, Ga, In and Sc. Examples of luminescent materials are described below.

As indicated above, the light generating system is configured to generate in an operational mode system light at least comprising the luminescent material radiation. The system light may also comprise unabsorbed device light, unless filtered away, or unless there is no unabsorbed device light (in the case of full conversion). Further, other light generating devices than described herein may be available, which generate light that may be comprised by the system light in the operational mode. Yet further, it may also be possible that a plurality of light generating devices is available, having different spectral power distributions of the device light, optionally with accompanying optics, that comply with the same principle as described herein. Hence, the term "system" may in embodiments relate to a plurality of systems, and may in specific embodiments relate to a plurality of systems that may share one or more elements, such as one or more optics. Especially, such plurality of system that may share one or more elements, may at least share a radiation exit window, like an end window of light transmissive (solid) material or an opening in a housing.

Especially, in embodiments the device radiation may comprise one or more of UV and visible radiation. In specific embodiments, the device radiation is essentially visible radiation, like blue light. Especially, in embodiments the luminescent material radiation may comprise one or more of visible radiation and IR radiation. In specific embodiments, the luminescent material radiation is essentially visible radiation, like yellow and/or red light, with optionally at maximum 20%, such as at maximum 10% of the power of the spectral power distribution of the luminescent material radiation at wavelengths beyond 780 nm.

The system, or apparatus, or device may execute an action in a "mode" or "operation mode" or "mode of operation". Likewise, in a method an action or stage, or step may be executed in a "mode" or "operation mode" or "mode of operation" or "operational mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

In embodiments, system may be configured to generate white light in the operational mode. This is further elucidated below.

As further indicated above, the optics may comprise first optics and second optics. Hence, the term optics is used to indicate different optics that may be comprised by the system, but at least the first optics and second optics. The optics may further comprise optics to polarize the laser light (emanating from the laser), or optics to reflector the luminescent material light, or optics to focus, or optics to collimate, etc. etc., including combinations of two or more.

Especially, in embodiments the first optics and/or the second optics have one or more of (i) a polarization dependent transmission, (ii) a polarization dependent reflection for the polarized laser radiation, and (iii) a polarization change effect (wherein the polarization of the (laser) device radiation is changed). Especially, the first optics and second optics may have a function to pass remaining polarized laser light. Assume there would be no full absorption of the polarized laser light by the luminescent material, then part of the polarized laser light may propagate along the same path way the luminescent material light may escape from the system. To this end, the first optics and/or second optics, especially the second optics have one or more of (i) a polarization dependent transmission and (ii) a polarization dependent reflection for the polarized laser radiation. Especially, in embodiments the first optics are configured to change the polarization of the polarized laser radiation, such as a retarder (see also below). Alternatively or additionally, the second optics have one or more of (i) a polarization dependent transmission and (ii) a polarization dependent reflection for the polarized laser radiation. Therefore, in specific embodiments the first optics are configured to change the polarization of the polarized laser radiation, and the second optics have one or more of (i) a polarization dependent transmission and (ii) a polarization dependent reflection for the polarized laser radiation.

Hence, the polarization of the laser radiation as well as the first optics and second optics are in embodiments especially chose such that would be no full absorption of the polarized laser light by the luminescent material, than part of the polarized laser light may propagate along the same path way the luminescent material light may escape from the system. This also indicates a possible danger, that, would the luminescent material layer be damaged, laser light may escape from the system (see further below) without any attenuation by the luminescent material (layer).

Note that this does not imply that the light generating device may not be based on full conversion. Hence, in embodiments the luminescent material (layer) may be configured to convert part of the polarized laser radiation into luminescent material radiation, and some of the polarized laser radiation may pass the luminescent material, whereas in other embodiments the luminescent material (layer) may be configured to convert essentially all the polarized laser radiation into luminescent material radiation. As known in the art, there may also some loss due to non-100% quantum efficiency. With partial conversion, at least part of the laser radiation may propagate along the optical path of the luminescent material radiation to a radiation exit window. With essential full conversion, in theory at least part of the laser radiation may propagate along the optical path of the luminescent material radiation to a radiation exit window, which in practice could occur when e.g. the luminescent material would be provided in a too thin layer or would be damaged (leading non-full conversion).

In embodiments, one of the optics is configured to change the polarization of the polarized laser radiation. In combination with the fact that laser light may only propagate along a desired path, this allows the option that would one of the first optics and second optics not be available or function proper, the laser light may not propagate along a desired path. For instance to this end, one of the optics may be configured to change the polarization of the polarized laser radiation.

In specific embodiments, the first optics may be configured to change the polarization of the polarized laser radiation. In alternative embodiments, the second optics may be configured to change the polarization of the polarized laser radiation.

Further, in embodiments the light generating device and the optics are configured such that at least part of polarized laser radiation not absorbed by the luminescent material (especially due to non-full conversion) passes the first optics and the second optics, wherein relative to the luminescent material the second optics are configured downstream from the first optics and the luminescent material. Hence, in embodiments the light generating device and the optics may especially be configured such that, relative to an optical path of the luminescent material radiation emanating from the luminescent material, the second optics are configured downstream from the first optics and the luminescent material.

Here, phrases "relative to the luminescent material", and "relative to an optical path of the luminescent material radiation" and similar phrases, are used, especially to indicate that especially that part of the propagation of radiation is chosen that is followed by the luminescent material radiation (which emanates from the luminescent material in a direction of a radiation exit window of the light generating system). As will be indicated below, optics may be used in two directions, making it useful to use the terms "upstream" and "downstream" in relation to this specific definition of the first optics and second optics relative to the propagation of radiation that emanates away from the luminescent material radiation, especially in direction of an radiation exit window.

Hence, dependent upon the chosen configurations, the first optics may be configured upstream or downstream of the luminescent material. The second optics may be configured downstream of the luminescent material and downstream of the second optics. Hence, in embodiments the laser radiation may sequentially pass the first optics, the luminescent material, and the second optics. In alternative embodiments, the laser radiation may pass the second optics, the first optics, the luminescent material, and then again in reversed order the first optics and the second optics. Note that the term "passing", and similar terms" may refer to reflection and/or radiation.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

As indicated above, in specific embodiments the luminescent material layer may be coupled to the first optics or to the second optics. In embodiments, the luminescent material and at least one of the first optics and second optics may be configured in a layer stack. This may allow that when the luminescent material layer is damaged, like cracking or breaking, etc., also the first optics or second optics may crack or break, respectively. In this way, upon damage, which could otherwise lead to escape of high intensity radiation, now one of the first optics or second optics may (locally) loose its function, leading to a blocking of the polarized laser light or another pathway of the laser light then when in a non-damaged state. The luminescent material layer and the first optics with which the luminescent material layer may especially be coupled may be coupled physically, mechanically, or chemically. Coupling may be via physical means, like clamping elements, screws, etc. Alternatively or additionally, coupling may be via an adhesive (layer). Alternatively or additionally, coupling may be via coating the luminescent material layer on the first optics, like via sol-gel coating or chemical or physical vapor coating processes, or vice versa of the first (or second) optics on the luminescent material layer.

When the luminescent material layer is damaged, like cracking or breaking, non-full conversion may be the result. The term "non-full conversion" may also include no conversion at all (i.e. the luminescent material may not attenuate the laser radiation of the light generating device).

Here below, the invention is further mainly explained in relation to embodiments wherein the first optics may be coupled to the luminescent material layer.

Hence, especially in embodiments the first optics and the luminescent material layer may be comprised by a first layer stack. Especially, in embodiments the first optics may be attached to the luminescent material layer, such as via an adhesive layer (layer). As indicated above, a main face of the luminescent material layer and a main face of the first optics may be attached to each other (in embodiments via an (intermediate) adhesive layer.

In alternative embodiments, the luminescent material layer and the (first) optics may be available in a (first) stack with one or more layers in between. For instance, the (first) stack may comprise the luminescent material layer and the first optics, with a single layer in between. One or more layers of the one or more layers in between may e.g. be a support. Especially, the (multi-)layer in between is relatively thin. Hence, in embodiments the first layer stack may comprise an intermediate layer configured between the first optics and the luminescent material layer. Especially, in embodiments the intermediate layer may be attached to the first optics and the luminescent material layer. Further, in specific embodiment the intermediate layer may be a rigid layer. Yet further, in embodiments the (rigid) layer may have a thickness selected from the range of 0.5-100 µm, such as selected from the range of 1-100 nm, like up to about 50 µm, like in the range of 1-30 µm. A thin and/or rigid layer may allow that when the luminescent material layer cracks or breaks, also the intermediate layer and the first optics crack or break, respectively.

In alternative embodiments, there may be second stack (see further also below), and such second stack may in specific embodiments comprise the second optics and the luminescent material layer. Or the second stack may comprise the second optics and other optics (see below).

In alternative embodiments, the second optics are configured at distance from the first optics and at a distance from the luminescent material layer. This distance may be at least about a centroid wavelength of the luminescent material radiation. Hence, in specific embodiments the luminescent material radiation has a second centroid wavelength λ2, wherein the second optics and the first optics are configured at a distance equal to or larger than the second centroid wavelength λ2. As indicated above, other embodiments may also be possible.

Especially, the first optics may be relatively thin. This may in general be the case for half wave or quarter wave plates, which are embodiments of the first optics (see also below). Hence, in embodiments the first optics may have a thickness selected from the range of 0.5-40 μm, such as 1-20 μm. However, other thicknesses may also be possible.

As indicated above, in specific embodiments one or more of the first optics and second optics comprise a retarder. As known from the art, a waveplate or retarder is an optical device that alters the polarization state of a light wave travelling through it. A half-wave plate may shift the polarization direction of linearly polarized light (especially from s to p or from p to s polarization), and a quarter-wave plate may convert linearly polarized light into circularly polarized light (and vice versa). Especially, the retarder may be optimized for the centroid wavelength of the laser radiation. Hence, the retarder, especially the first optics, may be a ½ wave plate or a ¼ wave plate (see also below), for the centroid wavelength of the laser radiation. Hence, in embodiments the ½ wave plate or a ¼ wave plate may be a ½ wave plate or a ¼ wave plate, respectively for a wavelength $\lambda_r$ (retarder wavelength), wherein $(\lambda_c-5\text{ nm}) \leq \lambda_r \leq (\lambda_c+5\text{ nm})$, especially wherein $(\lambda_c-2\text{ nm}) \leq \lambda_r \leq (\lambda_c+2\text{ nm})$, such as about $(\lambda_c-1\text{ nm}) \leq \lambda_r \leq (\lambda_c+1\text{ nm})$.

In general, there may be two series of embodiments, though the invention is not limited to these two series of embodiments. In a series of embodiments, a transmissive mode is applied, and the first optics may comprise a half wave plate. In alternative embodiments, a reflective mode is applied, and the first optics may comprise a quarter wave plate. In the former embodiments, the non-absorbed device light may in principle pass once the first optics, and thus change polarization. In the latter embodiments, the non-absorbed device light may in principle pass twice the first optics, and (thus) also change polarization. Alternative solutions may also be chosen.

The luminescent material layer and the light generating device are either configured in the transmissive mode or in the reflective mode. In case the luminescent material layer and the light generating device are configured in the transmissive mode, the first optics comprises a half-wave retarder configured to alter a first polarization into a second polarization. The second optics comprises a semi-transparent mirror transmissive for the second polarization and non-transmissive for the first polarization. Therefore, in embodiments the luminescent material layer and the light generating device are configured in the transmissive mode, wherein the first optics comprises a half-wave retarder configured to alter a first polarization into a second polarization, and wherein the second optics comprises a semi-transparent mirror transmissive for the second polarization and non-transmissive for the first polarization.

The polarized laser light may have an optical axis. In embodiments, the light generating device and the optics may be configured such that the optical axis may be essentially perpendicular to the second optics. In alternative embodiments, there may be a small angle. This may allow a reduction of the laser light that may escape to the external of the system would the luminescent layer be damaged. Hence, in specific embodiments the luminescent material layer and the light generating device are configured in the transmissive mode, wherein the first optics comprises a half-wave retarder configured to alter a first polarization into a second polarization, wherein the polarized device radiation has an optical axis (O), wherein the second optics is configured under a non-perpendicular configuration with the optical axis (O). Especially, in embodiments an angle α relative to a normal to the second optics may be selected from the rang of smaller than 15° and larger than 0°, such as in the range of 1-15°, though other angles may also be possible. Also in this embodiment, especially the second optics may comprises a semi-transparent mirror reflective for the second polarization and transmissive for the first polarization. As indicated above, angle α ma in embodiments also be 0°.

Herein, when an element is indicated to be transmissive this may in embodiments imply that at one or more wavelengths the part of the radiation that is transmitted may be larger than the part of the radiation that is reflected or absorbed. Herein, when an element is indicated to be reflective this may in embodiments imply that at one or more wavelengths the part of the radiation that is reflected may be larger than the part of the radiation that is transmitted or absorbed.

The luminescent material light may escape from the luminescent material layer to different directions. The luminescent material layer may especially have two faces, opposite of each other. Escape from a first face may be desired. Hence, escape and loss of luminescent material light via a second face may, reduced by applying a mirror. Especially, this mirror may be transmissive for the polarized laser light (coming from upstream of the second face), but reflective for luminescent material light (propagating in the direction of the mirror), such that the luminescent material light that escapes from that second face, is reflected back into the luminescent material layer, and may have a chance to escape from the first face.

Hence, in embodiments (in the transmissive mode) the optics further comprise third optics, wherein the third optics are configured upstream of the luminescent layer, and wherein the third optics may be transmissive for the polarized device radiation and reflective for the luminescent material radiation.

Especially, in embodiments the third optics may comprise a polarization independent dichroic reflector for the luminescent material radiation.

Further, in embodiments the third optics may be reflective for the polarized laser radiation having a changed polarization downstream of the first optics.

Hence, in specific embodiments the third optics may (also) be comprised by the first layer stack, though this is not necessarily the case.

As indicated above, in specific embodiments the second optics maybe comprised by a second layer stack.

Above, some embodiments are described in relation to the transmissive move. Here below, some embodiments in relation to a reflective mode are described.

In the reflective mode, the polarized laser light may pass twice the first optics. Hence, in reflective mode a quarter wave plate may be obtained, which may thus effectively have the same effect as the half wave plate in the transmissive mode, especially in combination with a reflector element.

In case the luminescent material layer and the light generating device are configured in the reflective mode, the first optics comprise a quarter-wave retarder configured to alter a first polarization into a second polarization in combination with fourth optics. Further, the second optics comprises a semi-transparent mirror reflective for the second polarization and transmissive for the first polarization.

The fourth optics is reflective for polarized device radiation and the luminescent material radiation. The luminescent material layer is configured between the first optics and the fourth optics.

Hence, in embodiments the luminescent material layer and the light generating device may be configured in the reflective mode, wherein the first optics comprise a quarter-wave retarder (configured to alter a first polarization into a second polarization in combination with fourth optics), wherein the second optics comprises semi-transparent mirror reflective for the second polarization and transmissive for the first polarization, wherein the light generating system further comprises (the) fourth optics, reflective for polarized device radiation and the luminescent material radiation, wherein the luminescent material layer is configured between the first optics and the fourth optics.

As the second optics are in these embodiments used in the reflective mode, it may be desirable that the radiation that passes a stage comprising these second optics may also reflect the luminescent material light. Hence, in embodiments (in the reflective mode) the light generating system may further comprise third optics, wherein the third optics are transmissive for the polarized device radiation and reflective for the luminescent material radiation. Especially, (in the reflective mode) the third optics are configured downstream of the luminescent layer (with again using the luminescent material as reference; see also above).

In specific embodiments, especially in the reflective mode, the second optics and the third optics are comprised by a second layer stack.

The first optics and/or second optics and/or the third optics may each independently have a large aspect ratio of length and/or width, or diameter, and thickness. This may also apply for the luminescent material layer. In general, for the first optics and/or second optics and/or the third optics and/or the luminescent material layer may apply that they comprise two essentially parallel faces configured at a distance of each other which is the thickness. The two faces may be indicated as "main faces".

In a stack, one or both of these main faces may be adjacent, like in contact, with another layer or other layers, respectively.

These two faces may in embodiments essentially have the same area. This area of such face may be recalculated into a virtual or real diameter, irrespective of the shape of such face, which may in general be square, rectangular, or circular. Such diameter may also be indicated as equivalent circular diameter, and is a virtual diameter for a face not having a circular shape, and a real diameter for a face having circular shape. The equivalent circular diameter (or ECD) of an (irregularly shaped) two-dimensional shape is the diameter of a circle of equivalent area. For instance, the equivalent circular diameter of a square with side a is $2*a*SQRT(1/\pi)$. For a circle, the diameter is the same as the equivalent circular diameter. Would a circle in an xy-plane with a diameter D be distorted to any other shape (in the xy-plane), without changing the area size, than the equivalent circular diameter of that shape would be D. Especially, the aspect ratio of D/d first optics and/or second optics and/or the third optics, with D being the equivalent circular diameter and d being the thickness, may be at least 10, such as at least 20, and may in embodiments even be up to about 10,000 or larger. The same values may apply for the luminescent material layer, though other values may also apply.

Hence, in embodiments the first optics may have a plate-like shape, like a plate having a rectangular, square, or circular cross-section (in the plane of the plate-like shape). Alternatively or additionally, the second optics may have a plate-like shape, like a plate having a rectangular, square, or circular cross-section (in the plane of the plate-like shape). Alternatively or additionally, the luminescent material layer may have a plate-like shape, like a plate having a rectangular, square, or circular cross-section (in the plane of the plate-like shape). Alternatively or additionally, the third optics may have a plate-like shape, like a plate having a rectangular, square, or circular cross-section (in the plane of the plate-like shape). Alternatively or additionally, the fourth optics may have a plate-like shape, like a plate having a rectangular, square, or circular cross-section (in the plane of the plate-like shape).

In embodiments, the system may be configured to generate white light in the operational mode. In other embodiments, the system may be configured to generate colored light in the operational mode. In yet further embodiments, the system may be configured to generate white light in one or more operational modes and colored light in one or more other operational modes. Control of color point, color temperature, centroid wavelength, etc., may especially be possible when one or more of the following embodiments may be comprised by the system: (a) part of the device light may be used to directly admix in the system light, without having to pass the luminescent material, (b) a second light generating device configured to generate device light, which may have another spectral power distribution than the device light used to pump the luminescent material, and which may or which may not have to pass the luminescent material (i.e. it may bypass the luminescent material by using optics, it may be transmitted, it may be reflected, . . . ), and (c) a combination of two or more of the systems described herein, which may optional share one or more elements, especially an end window. However, other embodiments may also be possible.

Further, the system may comprise or be functionally coupled to a control system. The control system may control the light generating device and optionally other devices, such as indicated above.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL.

The terms "visible", "visible light" or "visible emission" and similar terms refer to light having one or more wavelengths in the range of about 380-780 nm. Herein, UV may especially refer to a wavelength selected from the range of 200-380 nm.

The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues).

The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system.

Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Hence, in embodiments, the control system may control in dependence of one or more of an input signal of a user interface, a sensor signal (of a sensor), and a timer. The term "timer" may refer to a clock and/or a predetermined time scheme.

Especially, in embodiments the light generating device may be configured to generate blue polarized laser radiation. For instance, in combination with a yellow emitting phosphor, this may provide white light (in an operational mode). Further, especially the centroid wavelength of the luminescent material may be at least 30 nm, even more especially at least 40 nm, like in specific embodiments 50, such as at least 70 nm away from the centroid wavelength of the light generating device. This may be useful in view of the use of the optics. In general, and in first order approximation, the farther the centroid wavelengths are away, the better they can be separated, and thus the better the first and second optics may execute their function. Hence, in specific embodiments the light generating device may be configured to generate polarized laser radiation having a first centroid wavelength $\lambda 1$, in specific embodiments in the blue, and wherein the luminescent material radiation has a second centroid wavelength $\lambda 2$, wherein $\lambda 2-\lambda 1 \geq 70$ nm, especially $\lambda 2-\lambda 1 \geq 90$ nm, such as at least 100 nm, like at least 110 nm difference.

Here below, some further embodiments are described.

The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source has a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source is configured to provide a beam of light. This beam of light (thus) escapes form the light exit surface of the light source.

The term "light source" may refer to a semiconductor light-emitting device, such as a light emitting diode (LEDs), a resonant cavity light emitting diode (RCLED), a vertical cavity laser diode (VCSELs), an edge emitting laser, etc.. . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module.

The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation.

Especially, in embodiments the term "laser" may refer to a solid-state laser. In specific embodiments, the terms "laser" or "laser light source", or similar terms, refer to a laser diode (or diode laser).

Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd:YLF) solid-state laser, promethium 147 doped phosphate glass ($147Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc.

In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light. The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light source is especially configured to generate light source light having an optical axis (O), (a beam shape,) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1° (FWHM), most especially ≤0.5° (FWHM). Hence, ≤2° (FWHM) may be considered (highly) collimated light source light. Optics may be used to provide (high) collimation (see also above).

As indicated above, the light generating device may especially comprise a laser or be a laser. Therefore, the light generating device is especially configured to generate (polarized) laser radiation.

As indicated above, the light generating system further comprises a luminescent body. Especially, the luminescent body comprises a luminescent material, wherein the luminescent body is configured in a light receiving relationship with the n laser light sources, wherein the luminescent material is configured to convert at least part of the laser light source light into luminescent material light. Especially, the luminescent material light comprises visible light, such as having a color point in the yellow or green.

The term "luminescent material" herein especially relates to inorganic luminescent materials, which are also sometimes indicated as phosphors. These terms are known to the person skilled in the art.

In embodiments, quantum dots and/or organic dyes may be applied, and may optionally be embedded in transmissive matrices like e.g. polymers, like PMMA, or polysiloxanes, etc. etc. Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore, the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content. Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera. Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170. Quantum confinement structures may thus also be converter elements. The organic luminescent materials, such as afore-mentioned dyes, or more especially specific (functional) groups thereof, may thus also be converter elements. Elements like (trivalent) Ce and divalent Eu are in the art also indicates as activators or activator elements or "dopants". Hence, especially the luminescent material is or comprises a converter element.

As indicated above, the light generating system especially further comprises a luminescent material configured to convert at least part of the light source light into luminescent material light having an emission band having wavelengths in one or more of (a) the green spectral wavelength range and (b) the yellow spectral wavelength range.

The term "luminescent material" especially refers to a material that can convert first radiation, especially (one or more of UV radiation and) blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion. In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise down-converter luminescent material, i.e. radiation of a larger wavelength is converted into radiation with a smaller wavelength ($\lambda_{ex}>\lambda_{em}$). In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials. The term "luminescent material" herein may also refer to a material comprising a luminescent material, such as a light transmissive host comprising the luminescent material.

Especially, the luminescent material is configured to convert at least part of the light source light into luminescent material light having an emission band having wavelengths in one or more of (a) the green spectral wavelength range and (b) the yellow spectral wavelength range, wherein the luminescent material comprises a (garnet) luminescent material of the type $A_3B_5O_{12}$:Ce, wherein A comprises one or more of Y, La, Gd, Tb and Lu, and wherein B comprises one or more of Al, Ga, In and Sc. Hence, the luminescent material light may e.g. green light or yellow light (or in specific embodiments even orange (dependent upon the composition of the garnet and cerium concentration)). However, other embodiments are also possible, see below. In embodiments, 0.05-10% of the A elements comprise Ce, even more especially 0.05-5%, such as 0.1-5%. Especially, embodiments, 0.1-3% of the A elements comprise Ce, such as up to 2%, like selected from the range of 0.1-1.5%, such as at least above 0.5%.

Especially, a luminescent material comprises conversion material or is a conversion material. A luminescent material converts light from a light source, such as the light source light, into secondary light (here the luminescent material light). The luminescent material may comprise an organic group that converts the light, or a molecule that converts the light, or an inorganic group that converts the light, etc. Such groups (or molecule) may be indicated as converter element. The garnet type material as indicated above, comprises cerium (Ce) as converter element. Cerium comprising garnets are well known in the art.

Hence, in specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3B_5O_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq0.2$, wherein $y1+y2=1$, wherein $0\leq y2\leq0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as $>0.2$, like at least 0.8. Garnets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1-y2}Ga_{y2})_5O_{12}$, wherein Lu and/or Gd may be available. Even more especially, x3 is selected from the range of 0.001-0.1, wherein $0<x2+x3\leq0.1$, and wherein $0\leq y2\leq0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq0.2$, such as 0.001-0.1.

In specific embodiments, the light generating system may only include luminescent materials selected from the type of cerium comprising garnets. In even further specific embodiments, the light generating system includes a single type of luminescent materials, such as $(Y_{x1-x2-x3}A'_{x2}Ce_{x3})_3(Al_{y1-y2}B'_{y2})_5O_{12}$. Hence, in specific embodiments the light generating system comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1-y2}B'_{y2})_5O_{12}$. Here, wherein A' comprises one or more elements selected from the group consisting of lanthanides, and wherein B' comprises one or more elements selected from the group consisting of Ga In and Sc, wherein $x1+x2+x3=1$, wherein $x3>0$, wherein $0<x2+x3\leq0.2$, wherein $y1+y2=1$, wherein $0<y2\leq0.2$. Especially, x3 is selected from the range of 0.001-0.1. Note that in embodiments $x2=0$. Alternatively or additionally, in embodiments $y2=0$.

In specific embodiments, A may especially comprise at least Y, and B may especially comprise at least Al.

The garnet type luminescent material may also described with an alternative formula $A_3B'_2C''_3O_{12}$. Here, A may comprise one or more of (i) rare earth ions, such as one or more selected from $Y^{3+}$, $Lu^{3+}$, $Gd^{3+}$, $Tb^{3+}$, $La^{3+}$, and (ii) divalent cations, such as $Ca^{2+}$. Here, B may comprise one or more of (i) trivalent cations, such as one or more of $Al^{3+}$, $Ga^{3+}$, $Sc^{3+}$, $Sb^{3+}$, and $In^{3+}$, and (ii) divalent cations, such as one or more of $Mg^{2+}$ and $Mn^{2+}$. Here, C may comprise one or more of (i) trivalent cations, such as one or more of $Ga^{3+}$ and $Al^{3+}$, (ii) divalent cations, such as $Mn^{2+}$, and (iii) tetravalent cations, such as one or more of $Si^{4+}$ and $Ge^{4+}$. With such ions, the garnet crystal structure can be maintained. Other substitutions than mentioned may also be possible.

Alternatively or additionally, the luminescent material may e.g. be $M_2Si_5N_8$:$Eu^{2+}$ and/or $MAlSiN_3$:$Eu^{2+}$ and/or $Ca_2AlSi_3O_2N_5$:$Eu^{2+}$, etc., wherein M comprises one or more of Ba, Sr and Ca, especially in embodiments at least Sr. In specific embodiments, the first luminescent may comprise one or more materials selected from the group consisting of (Ba,Sr,Ca)S:Eu, (Ba,Sr,Ca)AlSiN$_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in CaAlSiN$_3$:Eu, the correct formula could be $(Ca_{0.98}Eu_{0.02})AlSiN_3$. Divalent europium will in general replace divalent cations, such as the above divalent alkaline earth cations, especially Ca, Sr, or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)$AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art. Hence, such nitride luminescent materials may also be or comprise converter elements, here especially $Eu^{2+}$.

Especially, the luminescent material may be an inorganic luminescent material, such as one or more of the above-described trivalent cerium or divalent europium comprising oxides, oxynitrides, or nitrides.

The luminescent material is configured to convert at least part of first radiation (selected from one or more of UV radiation and visible radiation), into luminescent material light. Especially, in embodiments the luminescent material may be configured to convert at least part of blue light (as radiation) into luminescent material light. Especially when blue light is partly converted, the blue light may be used as source of blue light (for the device light) and as excitation light that can be converted by the luminescent material. The first radiation may especially be provided by a (solid state) light source, see further below.

When different luminescent materials are applied, one or more luminescent materials may be configured to convert laser light source light into one or more of green and yellow luminescent material light, and one or more other luminescent materials may be configured to convert laser light source light into one or more of orange and red luminescent material light.

In specific embodiments, the luminescent body comprises a ceramic body comprising the luminescent material. Alternatively, the luminescent body comprises single crystal. In yet further specific embodiments, different types of luminescent bodies may be applied. Hence, the body may especially be selected from single crystalline bodies and ceramic bodies. The latter may be more easily made than the former, while they nevertheless may have good optical and/or thermal properties. Hence, in embodiments the body may be a ceramic body. However, in specific embodiments also a combination of single crystalline bodies and ceramic bodies may be applied. Especially, the luminescent body comprises a ceramic luminescent body. Hence, in specific embodiments the luminescent body is defined by a ceramic luminescent material. Therefore, in specific embodiments the luminescent material is a luminescent material that can be provided a ceramic luminescent body. Hence, the luminescent body may comprise a ceramic luminescent body.

Many of the above described luminescent materials, especially the garnet materials, can be provided as ceramics (ceramic body or ceramic slab). At least this applies for the above described $A_3B_5O_{12}$:Ce, or with an alternative formula described $A_3B'_2C''_3O_{12}$:Ce (see also below).

Ceramic bodies are known in the art. Especially, the ceramic material may be obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

In embodiments, the body has lateral dimensions width or length (W or L) or diameter (D) and a thickness or height (H). In embodiments, (i) D≥H or (ii) and W≥H and/or L≥H. The luminescent tile may be transparent or light scattering. In embodiments, the tile may comprise a ceramic luminescent material. In specific embodiments, L≤10 mm, such as especially L≤5 mm, more especially L≤3 mm, most especially L≤2 mm. In specific embodiments, W≤10 mm, such as especially W≤5 mm, more especially W≤3 mm, most especially W≤2 mm. In specific embodiments, H≤10 mm, such as especially H≤5 mm, more especially H≤3 mm, most especially H≤2 mm. In specific embodiments, D≤10 mm, such as especially D≤5 mm, more especially D≤3 mm, most especially D≤2 mm. In specific embodiments, the body may have in embodiments a thickness in the range 50 μm-1 mm. Further, the body may have lateral dimensions (width/diameter) in the range 100 μm-10 mm. In yet further specific embodiments, (i) D>H or (ii) W>H and W>H. Especially, the lateral dimensions like length, width, and diameter are at least 2 times, like at least 5 times, larger than the height. Herein, the height of the luminescent body is also indicated with H1.

In specific embodiments, the light generating system may comprise a plurality of luminescent bodies. These plurality of luminescent bodies may include bodies that have individual dimensions that are smaller than of body describe above. In embodiments, however, the general ratios of the dimensions may apply as well.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

In yet a further aspect, the invention also provides a lamp or a luminaire comprising the light generating system as defined herein. The luminaire may further comprise a housing, optical elements, louvres, etc. etc. . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. The light generating system may also be used for disinfection or optical wireless communication. Hence, in an aspect the invention also provides a light generating device selected from the group of a lamp, a luminaire, a projector device, a disinfection device, and an optical wireless communication device, comprising the light generating system as defined herein.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION OF THE EMBODIMENTS

Figure 1A:
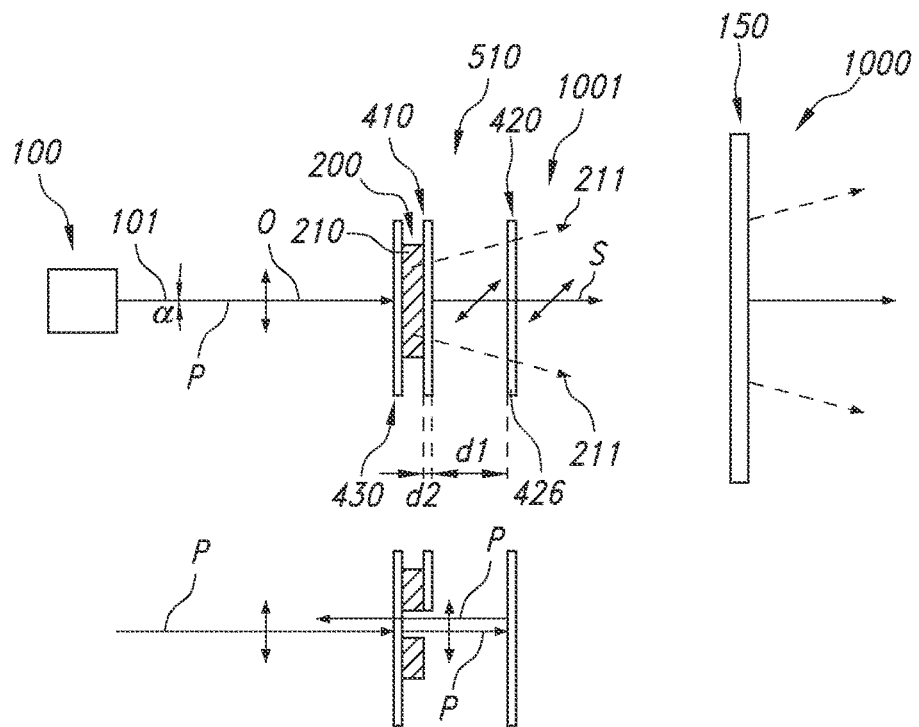
FIG. 1a schematically depicts an embodiment in the transmissive mode.

In laser-pumped systems, eye safety is of major concern. In case of a system failure, it is important to prevent focused or collimated laser light from escaping the system, thus creating the possibility of exposing people to direct laser light. Depending on the exact construction of the system, the system may fall under the laser safety directive IEC60825 or the general lighting norm like IEC62471. By safeguarding negative effects in case of a system failure, the classification and hazard level may be reduced to lower levels, thus enabling easier market introduction/acceptance.

Laser lighting safety systems may rely on additional circuitry and sensors to detect malfunction and trigger the laser to shut down. Laser based lighting applications are focused on miniaturization and these electrical systems require additional package space to incorporate the additional sensors and circuitry. Electrical circuits are limited by the reliability of the components and may not work well in harsh environments, experience issues due to electromagnetic interference and false tripping.

A critical system failure mode is the damaging or disappearance of the phosphor, caused by thermal-mechanical stresses. When this happens in a reflective phosphor mode light engine, the reflection of the blue pump laser from the wavelength converter unit back towards the pump laser increases and this optical feedback might lead to damage in the light engine or in the worst case to emission of highly directed laser light into the ambient. In a transmissive mode light engine, damaging of the phosphor might lead directly to unsafe emission of laser light into the ambient.

Other failure modes comprise braking/cracking of an optical component in the light engine such as lenses, mirrors or beam splitters/combiners. Such failure modes might lead to changes in the angular distribution of the light or changes in the polarization state. There is a need to counteract such failure modes, preferably in a non-electronic way in order to assure enhanced robustness and rely on an inherent system-safety upon phosphor damage, thus preventing emission of collimated or focused laser light into the ambient.

The easiest way to produce white light using lasers is to use pump light in combination with converted light to produce white light. When the phosphor gets damaged an unsafe situation can occur where direct laser light comes out of the light source.

Here we suggest building a safety mechanism which blocks the laser light leaving the light source without the need for an electrical detection circuit. For this purpose, it is suggested using the polarization sensitive components together with a ½ or ¼ wave plate which gets destroyed when phosphor upon destruction of the phosphor.

Here below polarizing components will be described in detail for various configurations. For example, in a transmissive mode phosphor is placed on a dichroic mirror which reflects phosphor emission. On top of the phosphor a half wave plate is placed followed by a polarizing dichroic filter which reflects p-polarized blue light. When p-polarized blue light used to excite the phosphor blue light which is not absorbed by the phosphor gets transmitted through the phosphor and rotated by the wave plate to become s polarized. In the s-polarization state it is also transmitted by the dichroic filter which reflects only p-polarized blue light. This is schematically shown in FIG. 1a.

During the operation when the phosphor is destroyed the wave plate on top of it also becomes destroyed. This means that the p-polarized blue light keeps its p-polarization and gets reflected by the dichroic reflector which reflects p-polarization. In this way blue light escaping the device upon phosphor destruction is avoided as shown in FIG. 1a. In a similar way it is also possible to build in a safety mechanism without the need for a using electronic detection.

In FIG. 1a the situation for a half plate is shown which is damaged upon laser irradiation. In an alternative embodiment the half wave plate is attached the phosphor When the phosphor gets damaged, the half λ plate is removed together with the phosphor. The effect is the same as drawn in FIG. 1a, and no direct blue laser light will escape from the system.

FIG. 1a schematically depicts an embodiment of a light generating system 1000 comprising a light generating device 100, a luminescent material layer 200, and optics 400. The light generating device 100 is especially configured to generate polarized laser radiation 101, e.g. p-polarization. The luminescent material layer 200 comprises a luminescent material 210 configured in a light-receiving relationship with the light generating device 100 and configured to convert at least part of the polarized laser radiation 101 into luminescent material radiation 211.

The light generating system 1000 is configured to generate in an operational mode system light 1001 at least comprising the luminescent material radiation 211, and may optionally also comprise (unconverted) laser radiation 101 and optionally radiation of other light sources. The optics 400 comprise first optics 410 and second optics 420. The first optics 410 and second optics 420 especially have one or more of (i) a polarization dependent transmission and (ii) a polarization dependent reflection for the polarized laser radiation 101, and (iii) polarization modification. Especially, the first optics 410 are configured to change the polarization of the polarized laser radiation 101.

Especially, the polarization dependent transmission for the polarized laser radiation 101, or the polarization dependent reflection for the polarized laser radiation 101, or the polarization modification for the polarized laser radiation 101 may especially be optimized for the centroid wavelength $\lambda_c$ of the polarized laser radiation 101, such as ($\lambda_c$−5 nm)≤$\lambda_o$≤($\lambda_c$+5 nm), wherein $\lambda_o$ is the wavelength where the optical element may be optimized for or designed for, which may be $\lambda_r$ in case or a retarder.

The light generating device 100 and the optics 200 are especially configured such that at least part of polarized laser radiation 101 not absorbed by the luminescent material 210 passes the first optics 410 and the second optics 420, wherein relative to the luminescent material 210 the second optics 420 are configured downstream from the first optics 410 and the luminescent material 210.

By way of example, the second optics 420 are configured at a distance from the first optics 410, indicated with reference d1. In embodiments, the second optics 420 and the first optics 410 may be configured at a distance equal to or larger than the second centroid wavelength $\lambda 2$ (i.e. the centroid wavelength of the luminescent material radiation 211; see below). In this schematically depicted embodiment, the first optics 410 and the luminescent material layer 200 are comprised by a first layer stack 510. Further, the first optics 410 are attached to the luminescent material layer 200. In embodiments, the first optics 410 have a thickness selected from the range of 0.5-40 μm. Especially, one or more of the first optics 410 and second optics 420 comprise a retarder. Especially, (only) the first optics 410 comprises a retarder.

FIG. 1a schematically depicts an embodiment wherein the luminescent material layer 200 and the light generating device 100 are configured in the transmissive mode. The first optics 410 comprises a half-wave retarder 412 configured to alter a first polarization into a second polarization. Further, the second optics 420 comprises a semi-transparent mirror 426 transmissive for the second polarization and non-transmissive for the first polarization.

The light generating system 1000 may further comprise third optics 430. The third optics 430 are configured upstream of the luminescent material layer 200. Especially, the third optics 430 are transmissive for the polarized device radiation 101 and reflective for the luminescent material radiation 211. Further, in embodiments the third optics 430 may be reflective for the polarized laser radiation having a changed polarization downstream of the first optics. Hence, the third optics 430 may be reflective for the second polarization, such as in examples the s-polarization, but transmissive for the first polarization, such as in the examples the p-polarization. In embodiments, the third optics 430 comprise a polarization independent dichroic reflector for the luminescent material radiation 211. As schematically depicted, the third optics 430 may be comprised by the first layer stack 510. However, other embodiments may also be possible, such as at a distance.

Reference 150 indicates a radiation exit window. System light 1001 downstream of the radiation exit window may at least comprise luminescent material radiation 211 and optionally (laser) device radiation 101. Would the luminescent material layer 210 e.g. be broken, the first optics 410 may also be broken. Then, the second optics 420 prevent laser radiation to escape from the system via the radiation exit window 150.

Figure 1B:
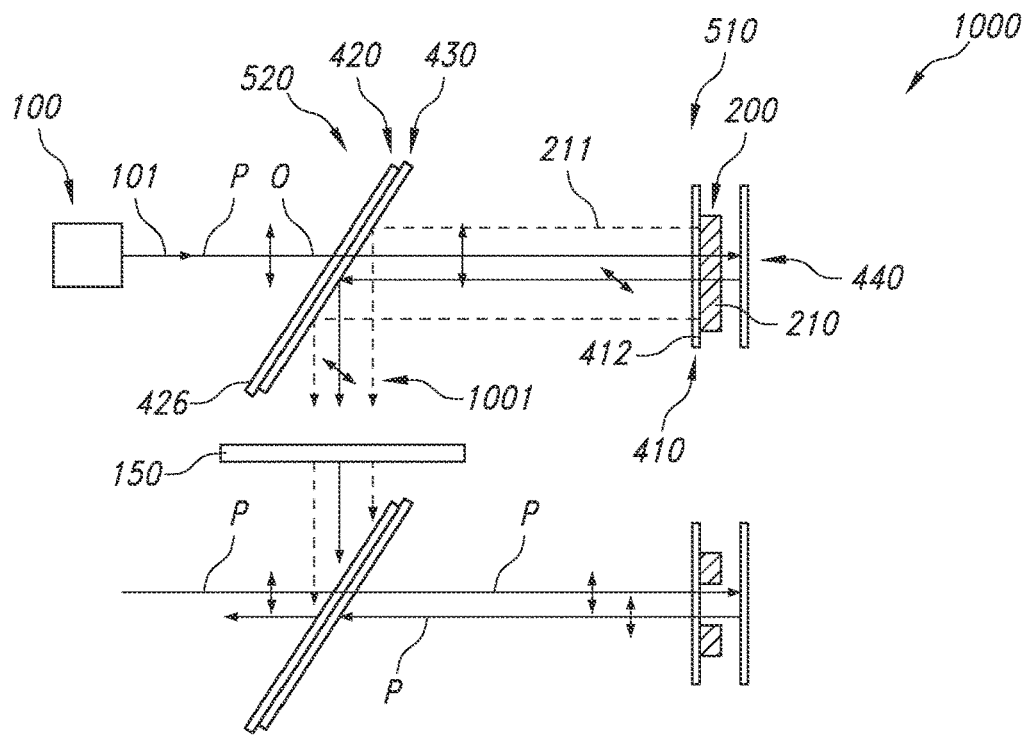
FIG. 1b schematically depicts an embodiment in the reflective mode.

In FIG. 1b, a configuration in the reflective mode is shown. p-polarized laser light from the laser first passes through dichroic blue reflector for s-polarized light. Then it passes through a quarter wave plate and the light becomes right circularly polarized. In the phosphor part of blue light gets absorbed and gets converted to yellow light. The metallic reflector behind phosphor reflects both blue and yellow light in the forward direction. Upon reflection right circularly polarized light becomes left-handed circularly polarized. Upon going through the quarter wave plate blue light becomes s-polarized. In this state it becomes reflected by the polarization sensitive blue reflector. Blue light here becomes combined with yellow light which is reflected by a yellow reflecting dichroic filter to produce white light.

When the phosphor gets damaged/is removed the quarter wave plate also becomes damaged/is removed and stops working. In that case P-polarized laser light from the laser first passes through dichroic blue reflector for s-polarized light. Then it gets reflected by the metallic reflector while keeping its p polarization. In this state it passes through the polarization sensitive blue reflector and it does not get out. Here again in the reflective mode safe laser is obtained without electrical detection as shown in FIG. 1b.

Suggested configurations can also be used on a phosphor wheel.

Hence, FIG. 1b schematically depicts an embodiment of the light generating system 1000, wherein the luminescent material layer 200 and the light generating device 100 are configured in the reflective mode. Especially, the first optics 410 comprise a quarter-wave retarder 412 (configured to alter a first polarization into a second polarization in combination with fourth optics 440). In embodiments, the second optics 420 comprises semi-transparent mirror 426 reflective for the second polarization and transmissive for the first polarization. In embodiments, the light generating system 1000 further comprises (the) fourth optics 440, reflective for polarized device radiation 101 and the luminescent material radiation 211. As schematically depicted, the luminescent material layer 200 is configured between the first optics 410 and the fourth optics 440. The light generating system 1000 may (also) further comprise third optics 430. The third optics 430 are transmissive for the polarized device radiation 101 and reflective for the luminescent material radiation 211. Especially, the third optics 430 are configured downstream of the luminescent material layer 200.

In embodiments, the second optics 420 and the third optics 430 are comprised by a second layer stack 520. As indicated above, a main face of the second optics 420 layer and a main face of the third optics 430 may be attached to each other (in embodiments via an (intermediate) adhesive layer.

Referring to FIG. 1a, in the transmissive mode, the laser may provide s-polarized radiation, the retarder may be arranged to change s-polarized radiation to p-polarized radiation, and the optics 420 may be arranged to transmit p-polarized radiation. The retarder and luminescent material and optics 420 are arranged in a certain order as described herein. Basically this implies in embodiments that in what way the laser light may propagate, following luminescent material radiation emanating from the luminescent material layer first passes the first optics and then the second optics on its way to a radiation exit window 150. Of course, in alternative embodiments the light generating device 100 may provide p-polarized radiation; likewise, the (first and second) optics may be adapted (see also e.g. above). Referring to FIG. 1a, in the reflective mode, the laser may provide s-polarized radiation, the optics 420 may be transmissive for s polarized radiation, and the retarder may be arranged to change s-polarization to p-polarized radiation. The optics 420 may be arranged to reflect p polarized radiation. The retarder and luminescent material and optics 420 are arranged in a certain order as described herein. Basically this implies in embodiments that in what way the laser light may propagate, following luminescent material radiation emanating from the luminescent material layer first passes the first optics and then the second optics on its way to a radiation exit window 150. Of course, in alternative embodiments the light generating device 100 may provide p-polarized radiation; likewise, the (first and second) optics may be adapted (see also e.g. above). Hence, referring to FIGS. 1a and 1b, embodiment are depicted wherein the light generating device 100 and the optics 200 are configured such that, relative to an optical path of the luminescent material radiation 211 emanating from the luminescent material 210, the second optics 420 are configured downstream from the first optics 410 and the luminescent material 210.

Figure 2A:
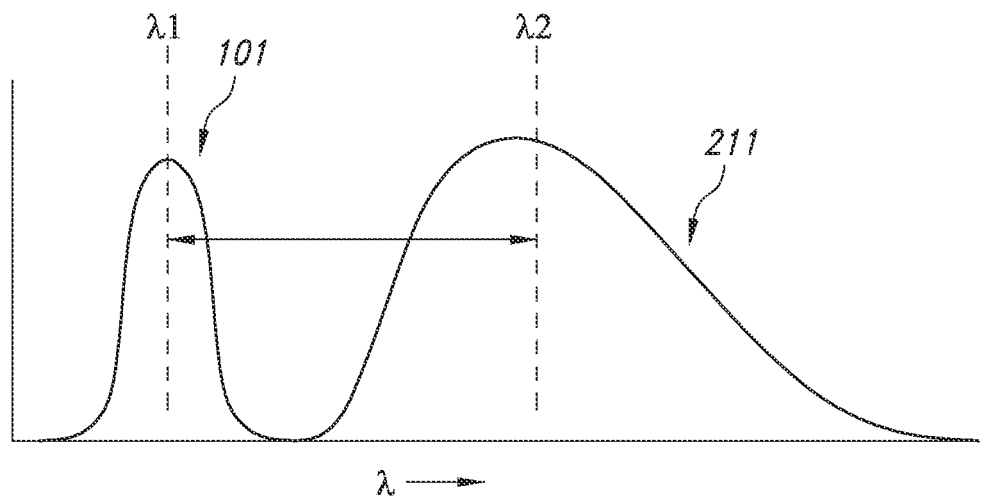
FIGS. 2a-2b schematically depict some further aspects.

Referring to FIG. 2a, the light generating device 100 may be configured to generate polarized laser radiation 101 having a first centroid wavelength $\lambda 1$, e.g. in the blue, and wherein the luminescent material radiation 211 may have a second centroid wavelength $\lambda 2$, e.g. in the yellow. Especially, in embodiments $\lambda 2 - \lambda 1 \geq 70$ nm, even more especially $\lambda 2 - \lambda 1 \geq 90$ nm. As indicated above, in embodiments the luminescent material layer 200 may comprise a ceramic body comprising the luminescent material 210, wherein the luminescent material 210 comprises a luminescent material of the type $A_3B_5O_{12}$:Ce, wherein A comprises one or more of Y, La, Gd, Tb and Lu, and wherein B comprises one or more of Al, Ga, In and Sc.

Figure 2B:
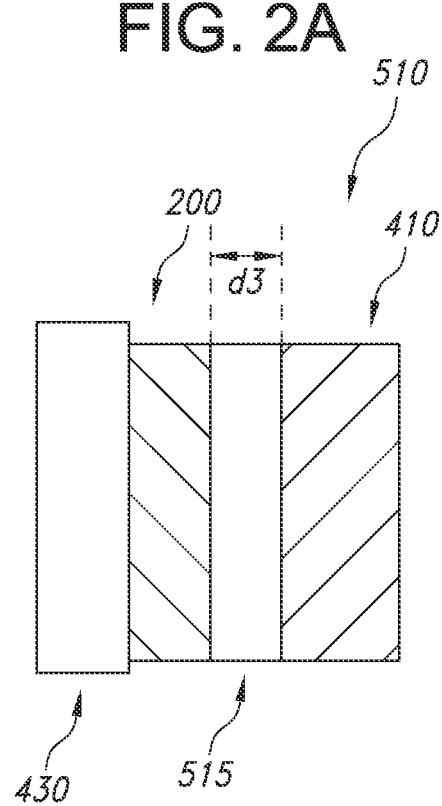

FIG. 2b schematically depicts an embodiment wherein the first layer stack 510 comprises an intermediate layer 515 configured between the first optics 410 and the luminescent material layer 200. The intermediate layer 515 is attached to the first optics 410 and the luminescent material layer 200. Especially, the intermediate layer 515 is a rigid layer. Further, especially, the intermediate layer 515 has a thickness d3 selected from the range of 0.5-100 µm.

Figure 3A:
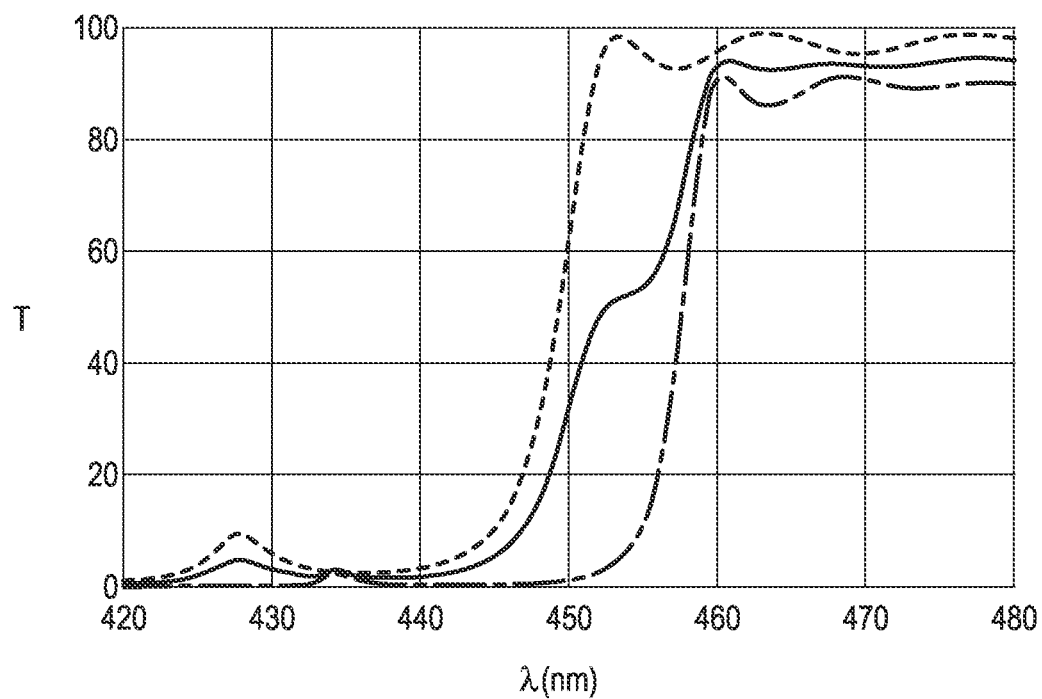
FIGS. 3a-3b schematically depict yet some further aspects.
Figure 3B:
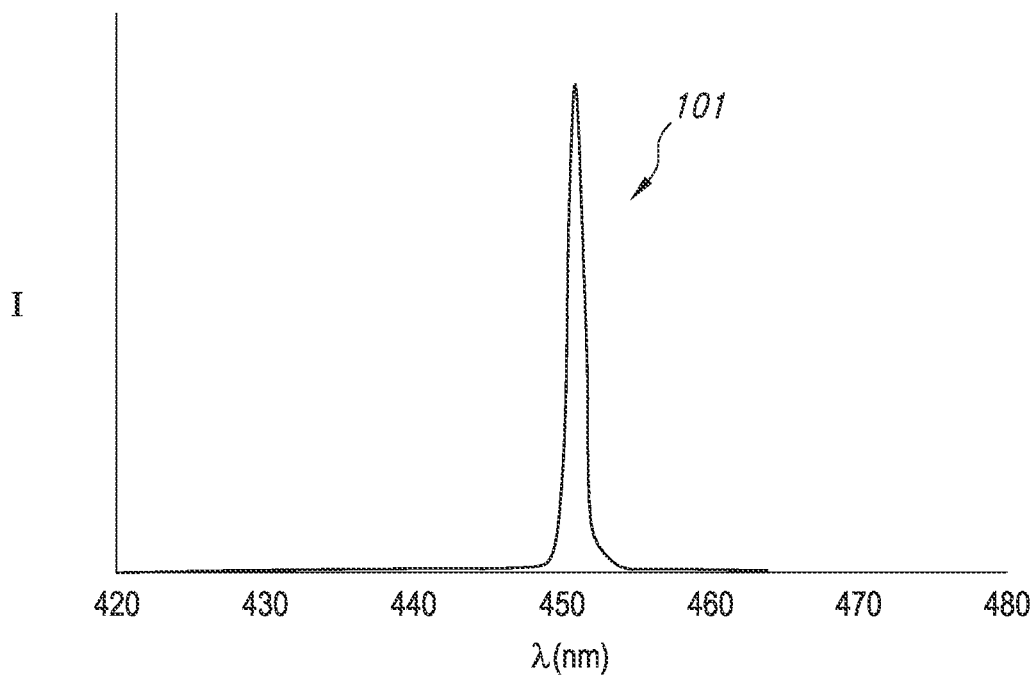

In another embodiment the dichroic mirror is used as polarization selective element. This mirror can selectively transmit or reflect certain wavelengths. The exact position of the e.g. a bandpass filter is polarization dependent (FIG. 3a). So, by choosing the band edge of such a filter carefully, it may act as a mirror for e.g. s-polarization and as a transmission window for p-polarization at a given wavelength. An example is shown in FIGS. 3a-3b. So, assume the wavelength of the laser is 452 nm. If the polarization is P-type, the laser will be transmitted. However, for the s-polarization state all the light will be reflected. It is clear from this that the mirror can thus be reflective and transmissive at the same time, but only depends on the polarization state of the laser light. Furthermore, also an angle dependency of the position on the s- and p-polarization band edges exist that can be exploited further for this purpose. The polarization selective mirror can be used in similar configurations as sketched above in FIGS. 1a-1b, both in reflective and transmissive mode.

Figure 4A:
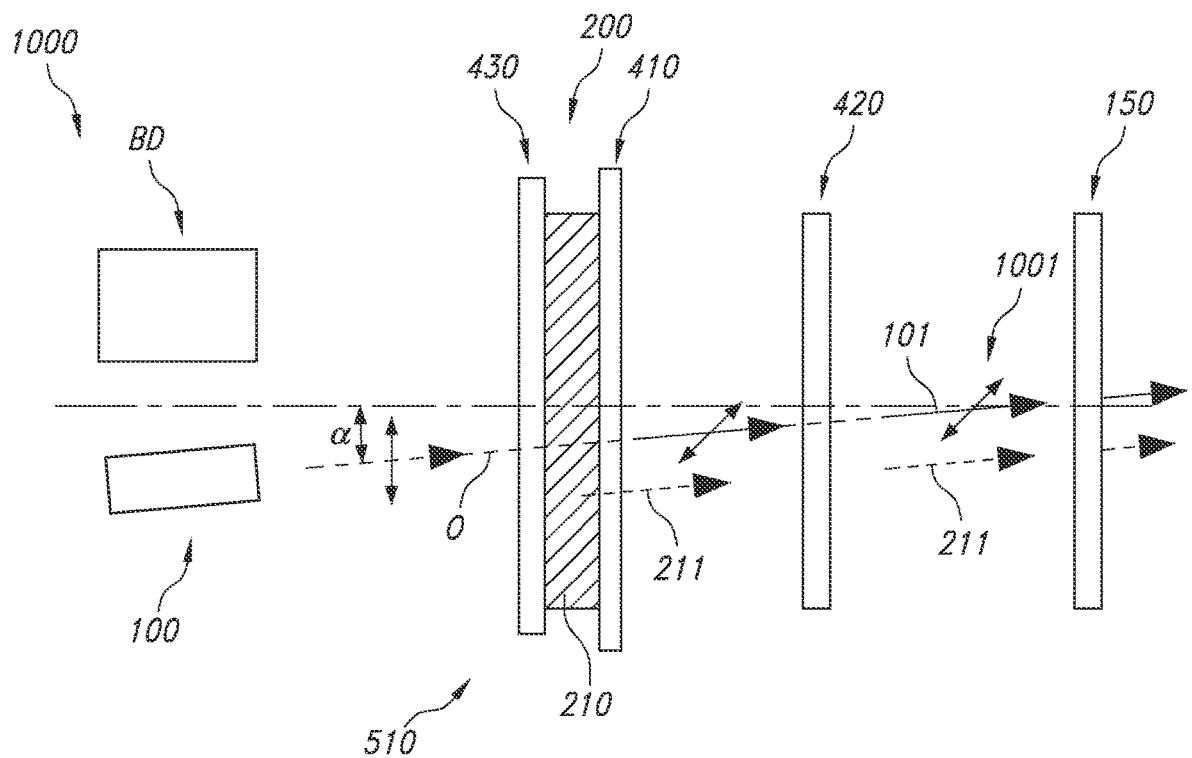
FIGS. 4a-4c schematically depict further embodiments and aspects.

FIG. 4a schematically depicts an embodiment wherein the luminescent material layer 200 and the light generating device 100 are configured in the transmissive mode. The first optics 410 comprises a half-wave retarder 412 configured to alter a first polarization into a second polarization. The polarized device radiation 101 has an optical axis O. The second optics 420 are configured under a non-perpendicular configuration with the optical axis O or the light generating device 100 is configured with the optical axis O of the device light 101 non-perpendicular to a normal to the second optics 420. Especially, an angle $\alpha$, relative to a normal to the second optics 420 is selected from the range of larger than 0° and equal to or smaller than 15°. Further, the second optics 420 may comprise semi-transparent mirror transmissive for the second polarization and reflective (i.e. essentially non-transmissive) for the first polarization. Reference BD indicated a beam dump.

Figure 4B:
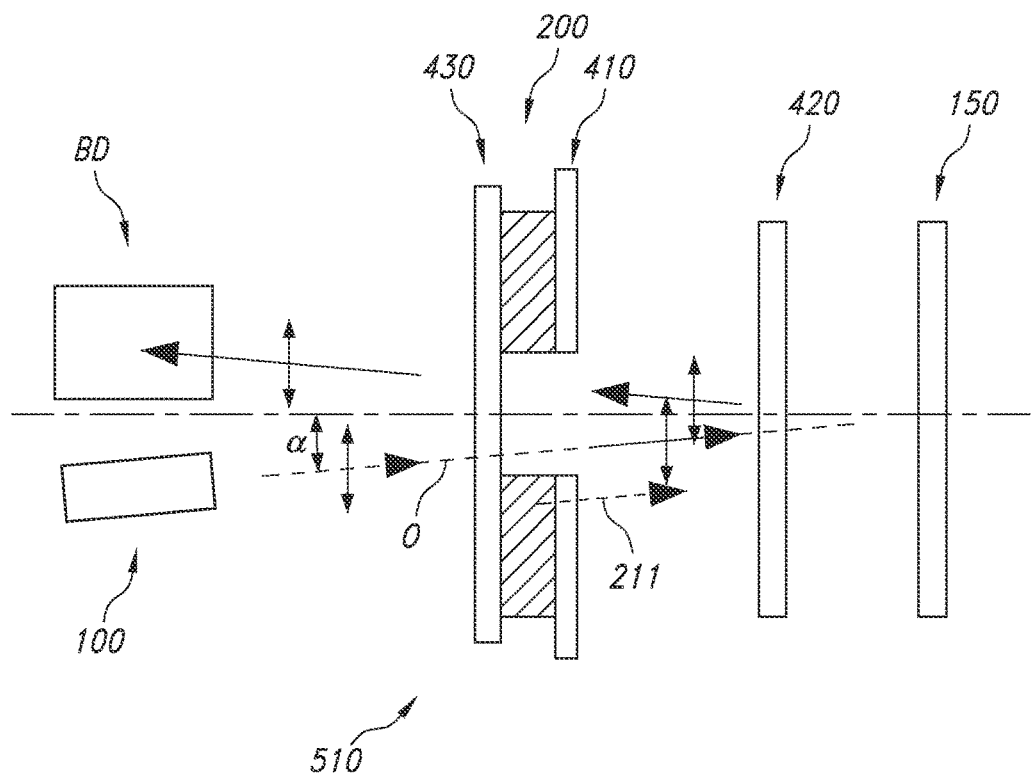

FIG. 4b schematically depicts the situation would the luminescent material 210 and the first optics 410 be damaged.

Figure 4C:
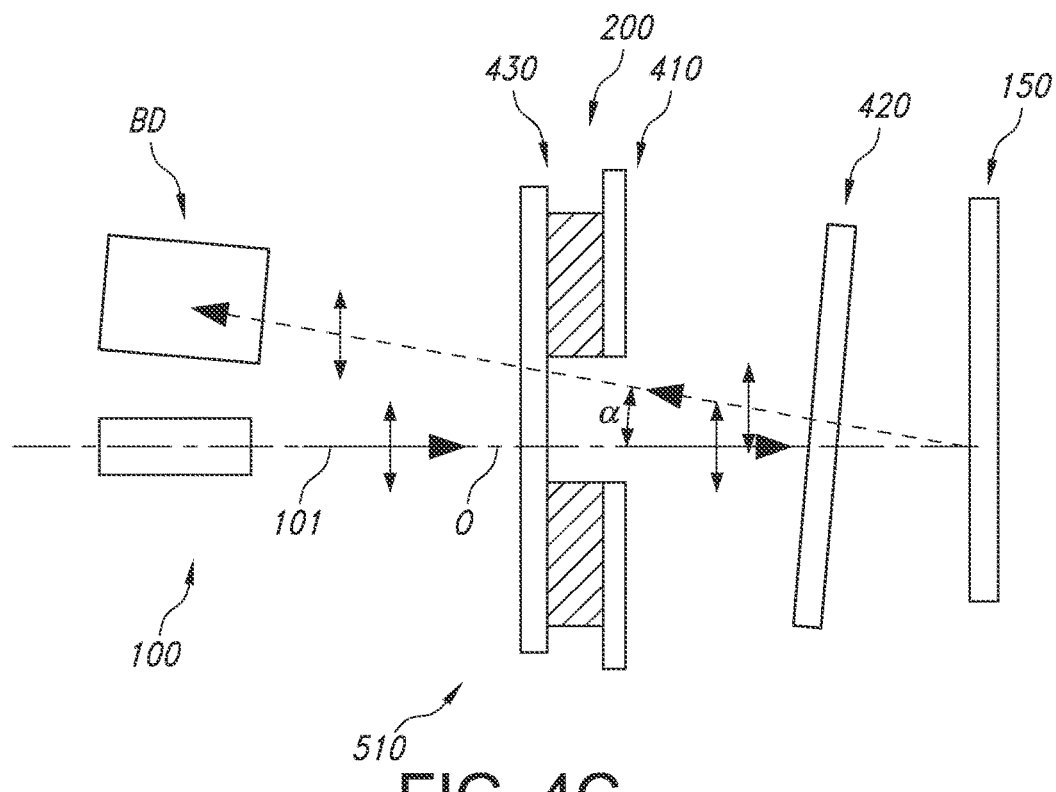

FIG. 4c schematically depicts an embodiment analogous to the embodiment schematically depicted in FIGS. 4a and 4b, however with the second optics 420 under a non-perpendicular angle with the optical axis O.

Figure 5:
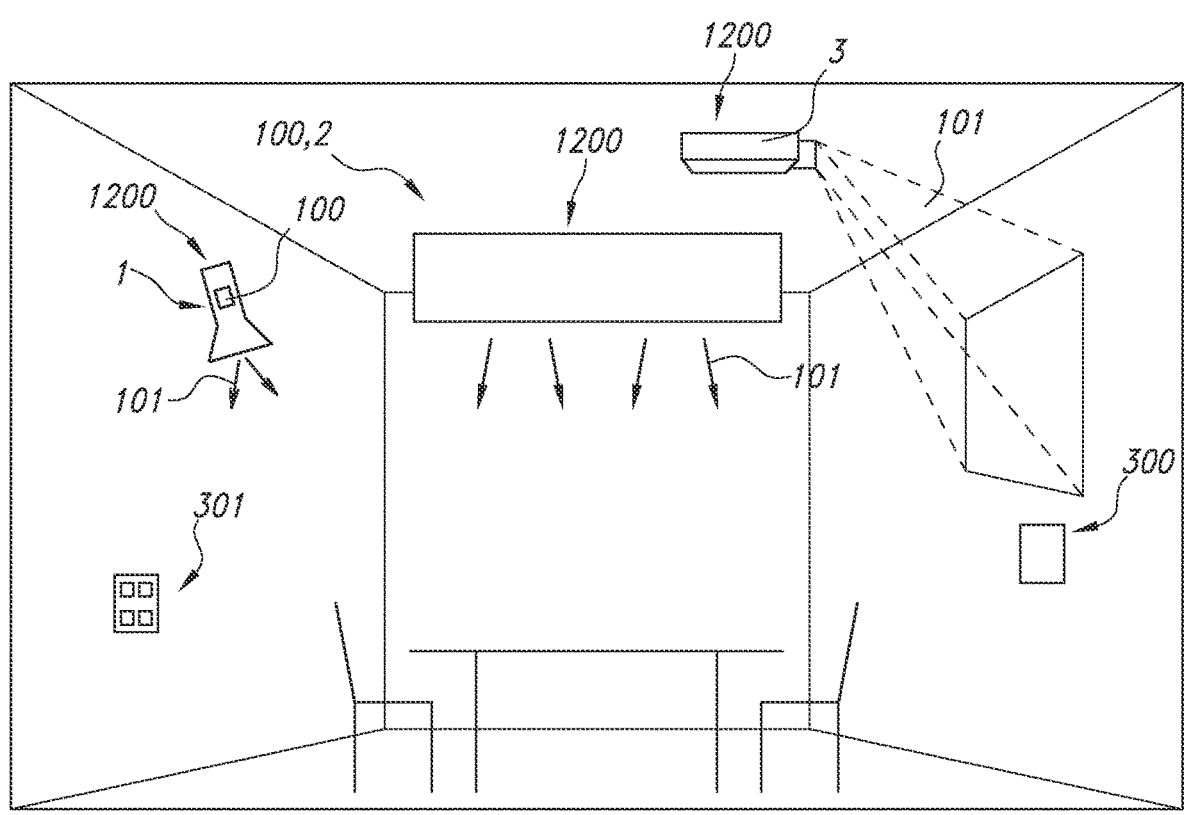
FIG. 5 shows some applications. The schematic drawings are not necessarily to scale.

FIG. 5 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 5 also schematically depicts an embodiment of lamp 1 comprising the light generating system 1000. Reference 3 indicates a projector device or projector system, which may be used to project images, such as at a wall, which may also comprise the light generating system 1000.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system comprising a light generating device, a luminescent material layer, and optics, wherein:
   the light generating device is configured to generate polarized laser radiation;
   the luminescent material layer comprises a luminescent material configured in a light-receiving relationship with the light generating device and configured to convert at least part of the polarized laser radiation into luminescent material radiation;
   the light generating system is configured to generate in an operational mode system light at least comprising the luminescent material radiation;
   the optics comprise first optics and second optics; wherein the first optics are configured to change the polarization of the polarized laser radiation, and wherein the second optics have one or more of (i) a polarization dependent transmission and (ii) a polarization dependent reflection for the polarized laser radiation; and
   the light generating device and the optics are configured such that, relative to an optical path of the luminescent material radiation emanating from the luminescent material, the second optics are configured downstream from the first optics and the luminescent material, wherein
   the luminescent material layer and the light generating device are configured in the transmissive mode, wherein the first optics comprises a half-wave retarder configured to alter a first polarization into a second polarization, and wherein the second optics comprises a semi-transparent mirror transmissive for the second polarization and non-transmissive for the first polarization.

2. The light generating system according to claim 1, wherein the first optics and the luminescent material layer are comprised by a first layer stack.

3. The light generating system according to claim 2, wherein the first optics are attached to the luminescent material layer, or wherein the first layer stack comprises an intermediate layer configured between the first optics and the luminescent material layer, wherein the intermediate layer is attached to the first optics and the luminescent material layer, wherein the intermediate layer is a rigid layer having a thickness selected from the range of 0.5-100 μm.

4. The light generating system according to claim 1, wherein the first optics have a thickness selected from the range of 0.5-40 μm.

5. The light generating system according to claim 1, wherein the laser radiation has a centroid wavelength $\lambda c$, the first optics comprise a retarder for a retarder wavelength $\lambda r$, wherein $(\lambda c - 5 \text{ nm}) < \lambda r \leq (\lambda c + 5 \text{ nm})$.

6. The light generating system according to claim 1, wherein the luminescent material comprises quantum dots.

7. The light generating system according to claim 1, wherein the optics further comprise third optics, wherein the third optics are configured upstream of the luminescent material layer, and wherein the third optics are transmissive for the polarized device radiation and reflective for the luminescent material radiation and reflective for the polarized laser radiation having a changed polarization downstream of the first optics.

8. The light generating system according to claim 7, wherein the third optics comprise a polarization independent dichroic reflector for the luminescent material radiation, and wherein the third optics are comprised by the first layer stack.

9. The light generating system according to claim 1, wherein the light generating device is configured to generate polarized laser radiation having a first centroid wavelength $\lambda 1$ in the blue, and wherein the luminescent material radiation has a second centroid wavelength $\lambda 2$, wherein $\lambda 2-\lambda 1 \geq 70$ nm.

10. The light generating system according to claim 1, wherein the luminescent material radiation has a second centroid wavelength $\lambda 2$ as defined in claim 9, wherein the second optics and the first optics are configured at a distance equal to or larger than the second centroid wavelength $\lambda 2$.

11. The light generating system according to claim 1, wherein the luminescent material layer comprises a ceramic body comprising the luminescent material, wherein the luminescent material comprises a luminescent material of the type $A_3B_5O_{12}$:Ce, wherein A comprises one or more of Y, La, Gd, Tb and Lu, and wherein B comprises one or more of Al, Ga, In and Sc.

12. A light generating device selected from the group of a lamp, a luminaire, a projector device, a disinfection device, and an optical wireless communication device, comprising the light generating system according to claim 1.

\* \* \* \* \*